United States Patent [19]
Vilotti

[11] 3,746,177
[45] July 17, 1973

[54] PORTABLE MAGNETIC RACK FOR GUNS, FISHING RODS AND THE LIKE

[76] Inventor: Donald Richard Vilotti, 535 Corbitt Drive, Burlingame, Calif. 94010

[22] Filed: Feb. 22, 1972

[21] Appl. No.: 228,206

[52] U.S. Cl............ 211/64, 248/205 A, 248/206 A
[51] Int. Cl............................................ F16m 13/02
[58] Field of Search.................. 248/205 A, 206 A, 248/206 R; 211/60 T, 64

[56] References Cited
UNITED STATES PATENTS

| | | | |
|---|---|---|---|
| 3,266,633 | 8/1966 | Graebner | 211/64 X |
| 2,959,295 | 11/1960 | Howard et al. | 211/64 |
| 2,959,832 | 11/1960 | Baermann | 248/206 A UX |
| 2,461,201 | 2/1949 | Ellis | 248/206 A UX |
| 3,131,897 | 5/1964 | Shelker et al. | 248/206 A X |
| 3,124,501 | 3/1964 | Wise | 248/206 A X |

Primary Examiner—William H. Schultz
Attorney—Joseph F. Cole

[57] ABSTRACT

A portable magnetic rack for guns, fishing rods and the like, wherein an elongated body of resilient material substantially rectangular in cross-section is provided, the body being flexible so that it may be flexed to conform to the surface contour of a metallic portion of an automobile when pressed thereagainst, with the body being disposed horizontally. The body is impregnated with magnetic particles dispersed throughout the length thereof so that the body will be firmly secured from end to end by magnetic attraction to the automobile. The body is fashioned with a plurality of vertical slots extending thereinto from a front face of the body, the slots being unobstructed so that a selected part of an upwardly-extending gun, fishing rod or the like may be leaned into each slot for support by the body.

4 Claims, 5 Drawing Figures

PORTABLE MAGNETIC RACK FOR GUNS, FISHING RODS AND THE LIKE

SUMMARY

It is a well known fact that many sportsmen often lean guns and fishing rods against the side of an automobile, and such items may fall to the ground when they become unbalanced or are brushed thereagainst by a person. This is particularly dangerous in the case of loaded guns.

Accordingly, it is proposed to provide a rack having an elongated body of resilient material that may be flexed so as to conform to the surface contour of a metallic portion of an automobile and arranged thereon in horizontal position when pressed thereagainst, the body being impregnated with magnetic particles dispersed throughout the length of the body so that the latter may be firmly secured from end to end by magnetic attraction to the automobile. The body is fashioned with a plurality of vertical slots extending thereinto from a front face thereof, whereby selected parts of upwardly extending guns, fishing rods and the like may be leaned into the slots for support by the body.

Other objects and advantages will appear as the specification proceeds, and the novel features of the invention will be particularly pointed out in the appended claims.

BRIEF DESCRIPTION OF THE DRAWINGS

For a better understanding of the invention, reference should be made to the accompanying drawings, forming part of this specification, in which.

While I have shown only the preferred embodiments the invention, it should be understood that various changes, or modifications, may be made within the scope of the appended claims without departing from the spirit thereof.

DETAILED DESCRIPTION OF THE PREFERRED EMBODIMENTS

Figure 1:
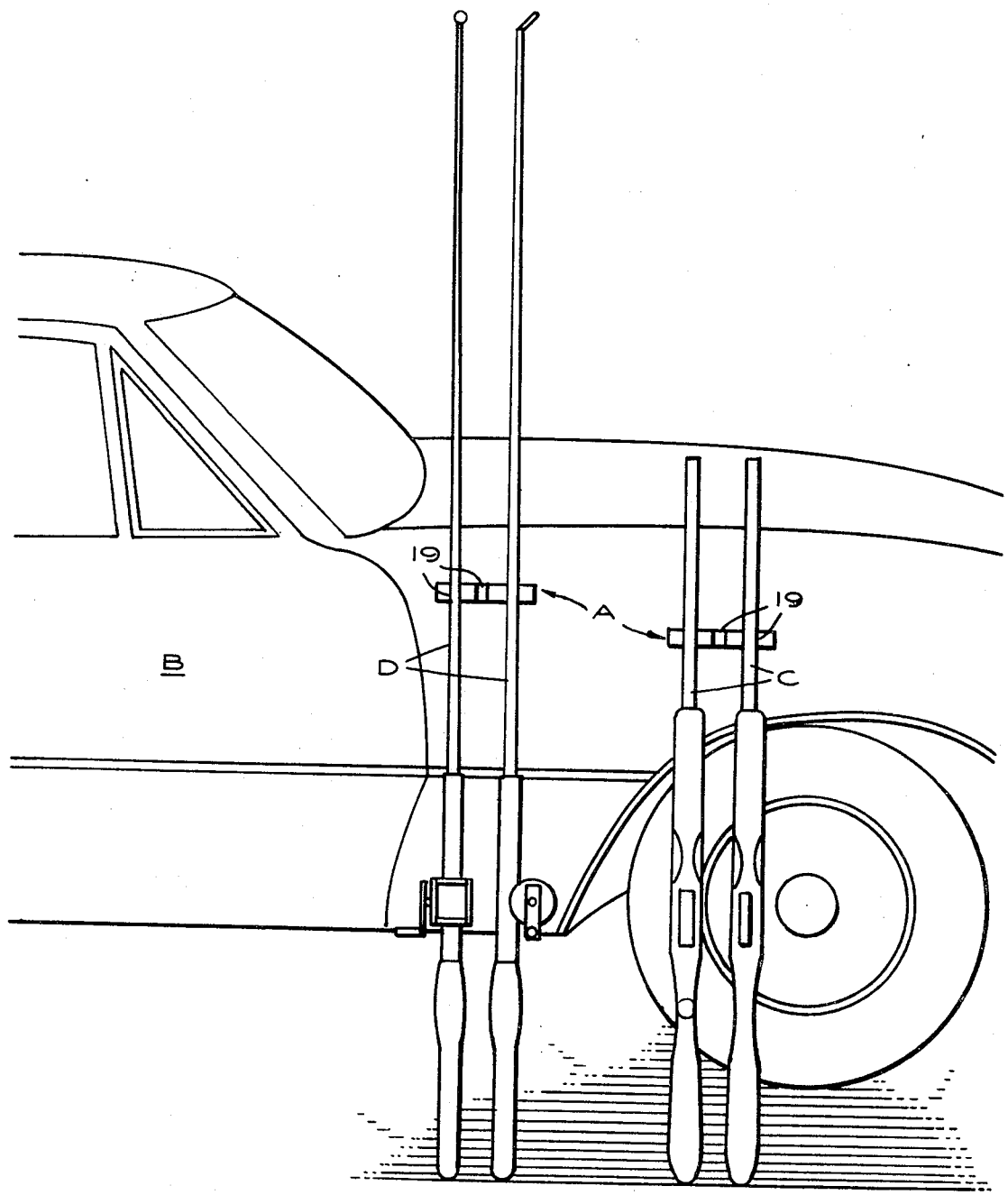
FIG. 1 is a side elevational view of an automobile showing my portable racks supporting guns, fishing rods and the like in position alongside the automobile.

Referring now to the first embodiment of the invention, as shown in FIGS. 1 to 4, inclusive, it will be noted that a rack A is provided, which may be supported on a metallic surface 10 of an automobile B, or other metallic surface, for securely holding guns C, fishing rods D, or the like; for example, bows of an archer, skis, or tools of a mechanic. In FIG. 1, a pair of racks A have been shown, but more or less racks may be utilized, depending upon the requirements. Moreover, although the racks A have been applied to the sides of the automobile B, it will be understood that the front, rear or top metallic surfaces of the automobile may be used for supporting the racks.

Figure 3:
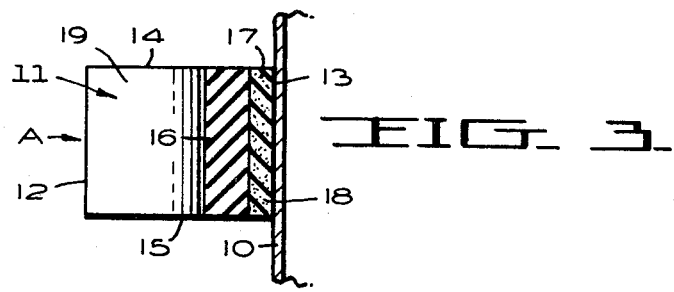
FIG. 3 is a sectional view taken along the plane 3—3 of FIG. 3.
Figure 4:
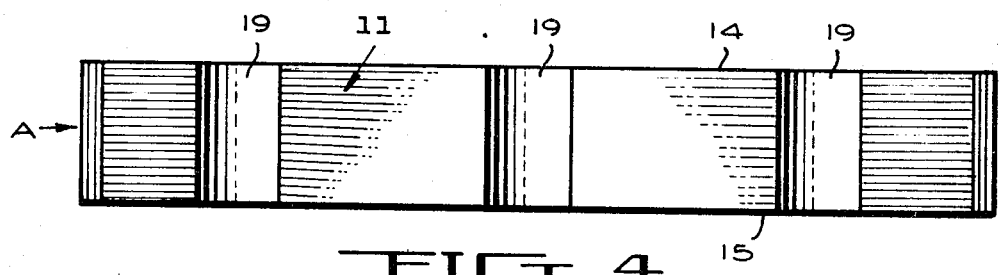
FIG. 4 is a front elevational view of the rack shown in FIG. 2.

The rack A has an elongated body 11 of resilient material substantially rectangular in cross-section and defining front, rear, upper and lower faces 12, 13, 14 and 15, respectively (see FIG. 3). The body 11 is flexible so that it may be flexed to conform to the surface contour of the metallic portion 10 when pressed thereagainst, and the body is adapted to be disposed horizontally as disclosed in FIG. 1. As disclosed in FIGS. 3 and 4, each of the upper and lower faces 14 and 15, respectively, define a plane and these planes are parallel with respect to one another.

Figure 2:
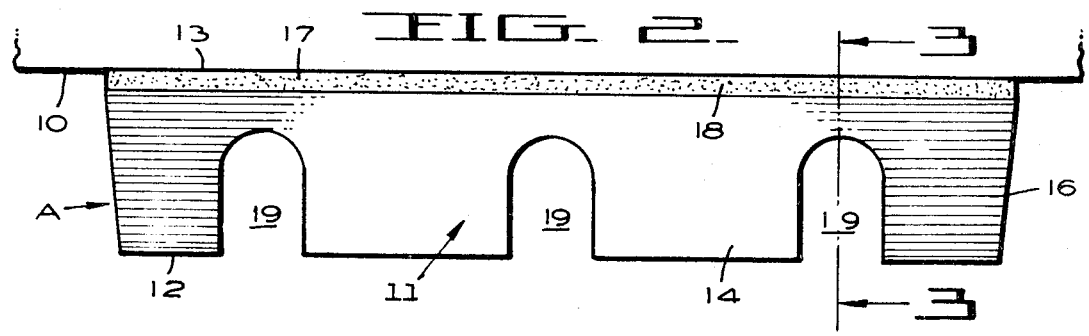
FIG. 2 is a top plan view of one embodiment of my portable magnetic rack.

As clearly shown in FIGS. 2 and 3, the body 11 is formed with a rubber frontal strip 16 having a resilient backing strip 17 bonded to the rear face thereof. This backing strip is confined between the planes of faces 14 and 15. The strips 16 and 17 constitute the elongated body 11 previously mentioned. The body 11 is impregnated with magnetic particles 18 dispersed throughout the length and height thereof so that substantially the entire area of the rear face of the body will be firmly secured from end to end and from its upper to lower face by magnetic attraction to the metallic portion or surface 10 of the automobile B; and in this first embodiment of the invention, the magnetic particles 18 are confined to the backing strip 17. Strips 16 and 17 have the same lengths and heights.

The body 11 is fashioned with a plurality of vertical slots 19 extending thereinto from the front face 12 of the body, with these slots extending from the upper to the lower faces 14 and 15, respectively. Each slot is unobstructed so that a selected part of an upwardly extending gun, fishing rod or the like may be leaned into the slot for support by the body 11. As shown in FIG. 1, the lower ends of the guns C and fishing rods D will rest on the ground. Of course, when the rack A is applied to the top of the automobile B, the rack will be supported substantially horizontally and the slots 19 will face upwardly.

As illustrated in FIG. 3, the body 11 is substantially uniform in height between the upper face 14 and the lower face 15 throughout the entire length thereof.

Figure 5:
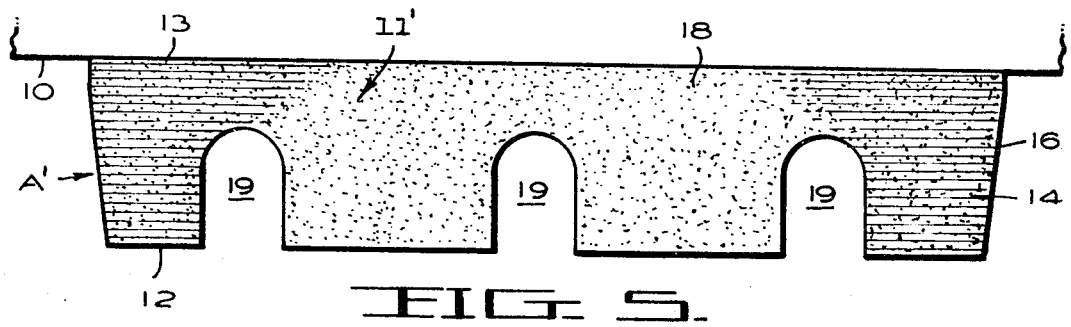
FIG. 5 is a top plan view of a modified embodiment of my portable magnetic rack.

Referring now to the second embodiment of the invention, as shown in FIG. 5, the backing strip 17 is omitted, and the magnetic particles 18 are dispersed throughout the rubber body 11'; otherwise, the two embodiments are identical and like reference numerals have been applied to corresponding parts. The rack in FIG. 5 has been designated by the reference letter A', and its purpose is the same as previously set forth in connection with the first embodiment of the invention.

I claim:

1. In a portable magnetic rack for guns, fishing rods and the like:

a. an elongated body substantially rectangular in cross-section and defining front, rear, upper and lower faces; the body being made to be pressed against a metallic surface of an automobile, or other metallic surface, at a desired elevation above the ground, and the body being adapted to be disposed horizontally; the body being impregnated with magnetic particles dispersed substantially throughout the length and height thereof so that substantially the entire area of the rear face will be firmly secured from end to end and from its upper to lower face by magnetic attraction to the metallic surface;

b. the body being uniform in height between the upper and lower faces thereof throughout the entire length of the body;

c. each of the upper and lower faces of the body defining a plane, and these planes being parallel with one another, and the magnetic particles being confined between these planes;

d. the body being fashioned with a plurality of vertical slots spaced one from the other and all of the slots extending into the body from the front face thereof, each slot being unobstructed so that a selected part of a gun, fishing rods or the like may be inserted into the slot for support by the body, with the lower end of the gun, fishing rods or the like resting on the ground.

2. The portable magnetic rack for guns, fishing rods and the like, as set forth in claim 1;

e. and in which the elongated body is constituted by a frontal strip having a backing strip bonded to its rear face, the backing strip being disposed between the planes of the upper and lower faces of the body, the magnetic particles being confined to the backing strip, and the frontal strip and backing strip having substantially the same lengths and heights, respectively.

3. The portable magnetic rack for guns, fishing rods and the like, as set forth in claim 2;

f. and in which both the frontal strip and the backing strip are made of resilient material that may be flexed to conform to the contour of the metallic surface against which the backing strip is pressed.

4. The portable magnetic rack for guns, fishing rods and the like, as set forth in claim 1;

e. and in which the magnetic particles are dispersed throughout the entire elongated body.

* * * * *